July 18, 1933.  J. B. PIERI  1,918,287
DOUGHNUT TURNER
Filed Nov. 16, 1931   2 Sheets-Sheet 1
Fig.1.
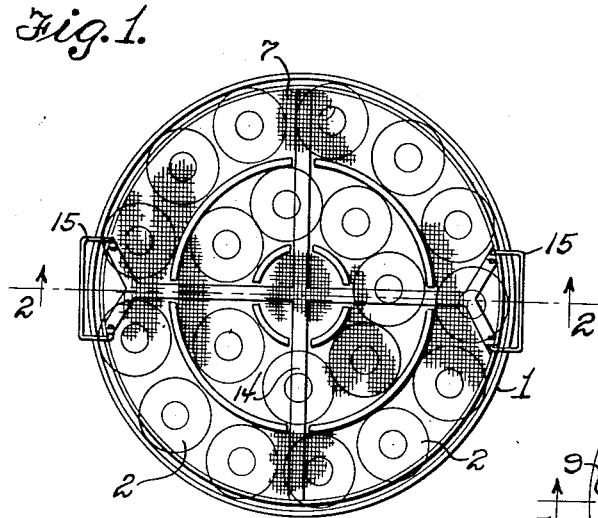
Fig.4.
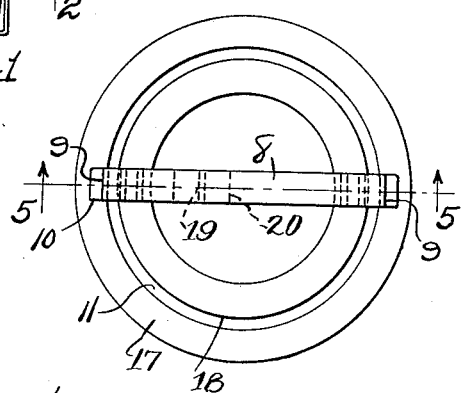
Fig.2.
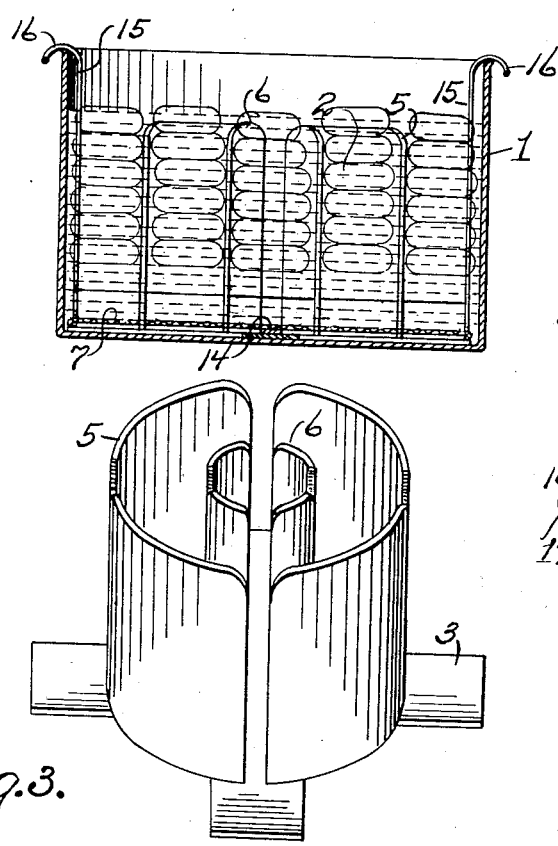
Fig.5.
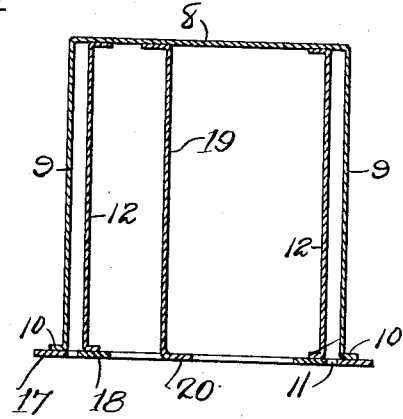
Fig.3.
Joseph B. Pieri
INVENTOR
BY Victor J. Evans
and Co. ATTORNEY July 18, 1933.  J. B. PIERI  1,918,287
DOUGHNUT TURNER
Filed Nov. 16, 1931   2 Sheets-Sheet 2
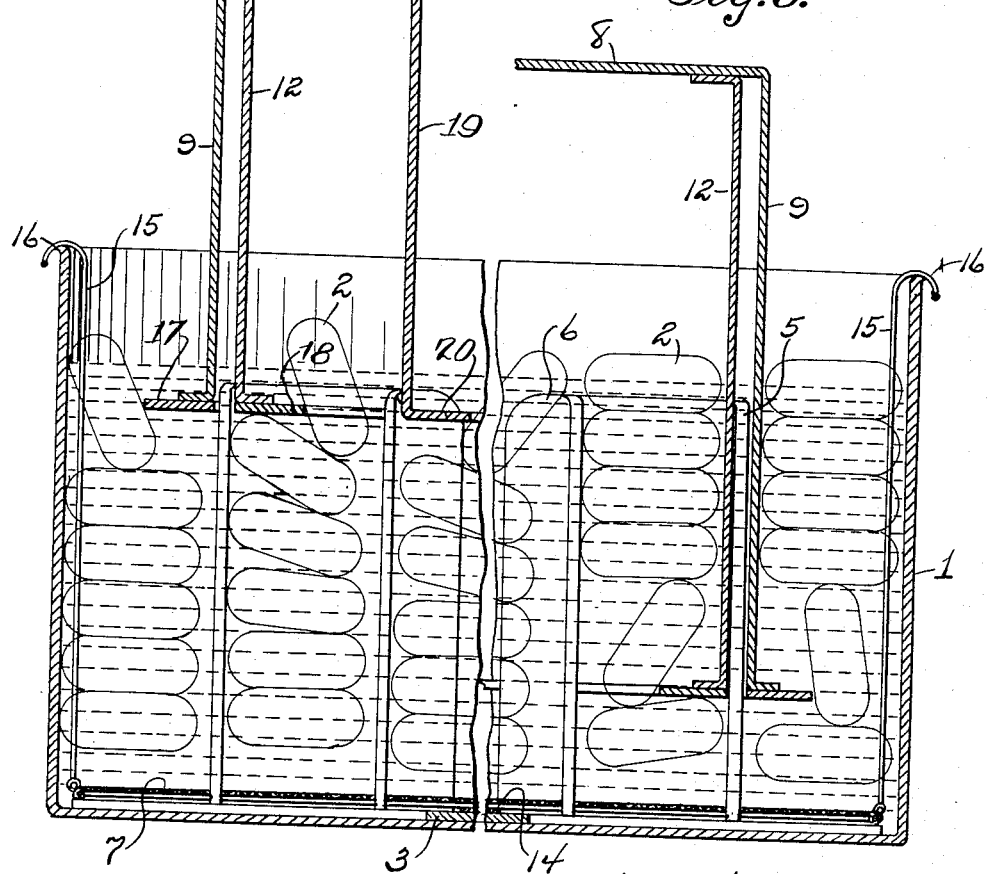
Joseph B. Pieri
INVENTOR
BY Victor J. Evans
and Co. ATTORNEY Patented July 18, 1933

1,918,287

UNITED STATES PATENT OFFICE

JOSEPH B. PIERI, OF GLENNS FERRY, IDAHO

DOUGHNUT TURNER

Application filed November 16, 1931. Serial No. 575,451.

In cooking certain classes of foodstuffs, such for instance as doughnuts, sliced potatoes, etc., it is necessary that the articles be turned in the deep fat in which they are fried. This requires the strict attention and a determined amount of labor upon the part of the chef, and therefore it is the primary object of this invention to provide means of an extremely simple nature whereby such articles may be turned in the cooking operation and readily removed from the cooking utensil.

To the attainment of the foregoing the invention consists in the improvement as hereinafter described and definitely claimed. In the accompanying drawings:—

Figure 1 is a top plan view illustrating the application of my invention.

Figure 2 is a sectional view approximately on the line 2—2 of Figure 1.

Figure 3 is a perspective view of one form of the drum.

Figure 4 is a top plan view of the turning device.

Figure 5 is a sectional view approximately on the line 5—5 of Figure 4.

Figure 6 is a plan view of the turner member.

Figure 7 is a sectional view approximately on the line 7—7 of Figure 6.

Figure 8 is an enlarged sectional view illustrating the manner in which the turning device is inserted in the drum for turning the partially cooked articles therein.

Figure 9 is a similar view showing the turner further inserted in the drum.

In the showing of the drawings I have illustrated my improvement in connection with a utensil in which doughnuts or crullers are cooked in a deep grease, but obviously the device may be employed in connection with other floatable articles to be cooked and turned in such grease.

In the drawings the numeral 1 designates a cooking utensil of the ordinary construction in which the doughnuts 2 are to be fried. The utensil is, of course, placed on the burner and is filled with a sufficient quantity of grease to cook the doughnuts. However, before the doughnuts are inserted in the utensil I arrange therein a member which I will term a drum. In the showing of Figure 3 of the drawings the drum comprises a base which is in the nature of a cross-shaped plate. The base 3 has secured thereon an upstanding tubular body portion 5, and this tube is formed of a plurality of arcuate sections which are spaced from each other. Arranged centrally in the tube 5 and secured to the base 3 there is another tube 6 which is also formed of a plurality of arcuate sections whose ends are spaced. The drum 3 is inserted in the utensil or vessel 1 and the doughnuts 2 are arranged around the slotted tubes 5 and 6. The shape of the base 3 permits the free passage of the grease so that the heated grease may freely circulate around the doughnuts.

The drum 3 rests on a wire mesh disc 7 which is of a size almost equaling that of the interior of the utensil. The reticulated disc 7 is mounted in a flanged ring 13 which has hingedly connected thereto rods or bars 15 whose outer ends are rounded, as at 16, to rest on the mouth of the utensil.

The outer series of doughnuts are arranged between the drum and the interior of the utensil 1.

The doughnut turner member comprises a base portion which includes an outer flat ring 17 to whose outer face there is fixed the flanged end 10 on parallel arms 9. These arms have their free ends connected, as at 8, the element 8 affording a handle and this element, together with the arms are of a substantially inverted U-shaped formation. Inward of the disc 7 and parallel therewith there is another disc 18 that has secured thereto the flanged lower ends of arms 12, the said arms having their outer ends also flanged and secured to the under face of the handle element 8. Also fixed to the under face of the handle 8 there is the flanged upper end of a plate or arm 19 whose lower end is flanged, as at 20, and the said flange is arranged in a plane with and in the flat ring 18.

The arms 9, 12 and 19 are so arranged that the space between the arms 19 and the discs 17 and 18 provide for the free passage of the rings 17 and 18 through the outer wall of the tube 5 and to permit of the arm 19 entering the inner tube 6 of the drum. The rings 17 and 18 will contact with the edges of the doughnuts received in the outer tube 5 and in the utensil 1, while the flange 20 on the arm 19 will contact with the edges of the doughnuts in the tube 6. Thus the downward movement of the turner device will cause the floating doughnuts to be turned upon themselves and thereby reverse their original position in the drum and in the utensil. The turner, after the doughnuts have been turned may remain in the drum until the doughnuts are completely cooked, and when this cooking operation is completed the handles 16 on the rods or arms 15 are grasped and the device as a whole, with the cooked doughnuts therein, is raised out of the utensil, the grease draining back into the utensil. By rearranging the drum and the disc 7 in the utensil other doughnuts may be cooked and turned in a manner as above described.

It is believed that the foregoing description, when read in connection with the drawings will clearly and fully set forth my improved device and its advantages. It is, of course, to be understood that I do not wish to be restricted to the precise details as herein set forth and hold myself entitled to make such changes as fairly fall within the scope of what I claim.

What I claim is:—

A doughnut cooking and turning device, including a utensil, a drum having a slatted bottom and having inner and outer split tubes arising from the bottom, a foraminous disc upon which the bottom rests, rods hingedly secured to the disc and having arched arms to rest upon the top of the utensil, and said utensil and cylinders designed to receive therein and to have arranged therearound doughnuts to be cooked in the grease in the receptacle and tubes, and a turner for the doughnuts comprising a bottom which includes inner and outer spaced flat rings, an inverted U-shaped member secured to the outer ring, plates connected to the outer ring and to the top of the inverted U-shaped member, another plate also connected to the top of the inverted U-shaped member and having a lower flange arranged within the area of the inner ring and said rings and the elements connected therewith being arranged to permit of the the rings and the offset end of the last-named element being received respectively in and adjacent to the outer wall of the outer tube and the inner wall of the inner tube for contacting and turning the doughnuts in said tubes and utensil.

In testimony whereof I affix my signature.

JOSEPH B. PIERI.